(12) United States Patent
Chu

(10) Patent No.: US 7,020,079 B2
(45) Date of Patent: Mar. 28, 2006

(54) BYPASSING PROTOCOL CHECKSUM COMPUTATIONS IN COMMUNICATIONS ACROSS A RELIABLE NETWORK LINK

(75) Inventor: Hsiao-Keng J. Chu, Palo Alto, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 973 days.

(21) Appl. No.: 10/035,563

(22) Filed: Oct. 23, 2001

(65) Prior Publication Data

US 2003/0076847 A1 Apr. 24, 2003

(51) Int. Cl.
*G01R 31/08* (2006.01)

(52) U.S. Cl. .................... 370/225; 395/200.66

(58) Field of Classification Search ........ 370/216–235, 370/235.1–240, 241–253; 395/182.02, 200.66
See application file for complete search history.

(56) References Cited

U.S. PATENT DOCUMENTS 5,815,516 A * 9/1998 Aaker et al. ................ 714/807
5,826,032 A * 10/1998 Finn et al. ................... 709/236
5,898,713 A * 4/1999 Melzer et al. ............... 714/807

* cited by examiner

*Primary Examiner*—Dang Ton
*Assistant Examiner*—Phuc Tran
(74) *Attorney, Agent, or Firm*—Park, Vaughan & Fleming LLP

(57) ABSTRACT

One embodiment of the present invention provides a system for bypassing use of a protocol checksum during communications across a reliable network link. The system operates by configuring a communication system to bypass use of the checksum during communications across the reliable network link. When the system subsequently receives an outbound packet to be transmitted to a destination across the reliable network link, the system sends the outbound packet to the destination without computing the checksum for the outbound packet. In one embodiment of the present invention, upon receiving an inbound packet from a source across the reliable network link, the system accepts the inbound packet without re-computing the checksum, wherein re-computation of the checksum is required by the communication protocol to verify that the inbound packet was received without errors.

30 Claims, 3 Drawing Sheets

BYPASSING PROTOCOL CHECKSUM COMPUTATIONS IN COMMUNICATIONS ACROSS A RELIABLE NETWORK LINK

BACKGROUND

1. Field of the Invention

The present invention relates to protocols for communicating across computer networks. More specifically, the present invention relates to a method and an apparatus for bypassing use of a protocol checksum during communications across a reliable network link.

2. Related Art

Protocols for communicating across a computer network typically rely on checksums to ensure that a message is communicated without errors. When a message is being sent, the sender computes a checksum by calculating a function over the message body. This checksum is then inserted into a packet containing the message before the message is sent across a computer network to a receiver. Upon receiving the message, the receiver re-computes the checksum using the same function employed by the sender and compares the re-computed checksum with the previously computed checksum contained in the packet. If the checksums match, the receiver has a high degree of confidence that the message did not change during the communication process. If the checksums do not match, the receiver knows that either the message body or the checksum contained in the packet has somehow become corrupted during the communication process.

Unfortunately, computing a checksum is a very computationally expensive process because the checksum function is applied to all of the data within the message body. This can be particularly burdensome for server computer systems that continually send and receive communications from numerous client computer systems. In these types of server computer systems, the computational workload from computing checksums can seriously degrade system performance.

In order to remedy this problem, it is possible to use special-purpose hardware to compute checksums. In this way, the computer system's processor can be freed from having to perform checksum computations. Note that this special-purpose hardware can be integrated into a network interface card (NIC) through which a computer system communicates across the computer network.

In order to facilitate using this special-purpose hardware, protocols have been modified so that a protocol stack will not compute a checksum if an associated NIC provides special-purpose hardware to perform the checksum computation.

For example, a NIC driver can inform the Internet Protocol (IP) stack that associated NIC has hardware checksum capability. During a subsequent transmission of an outgoing packet, the protocol stack does not compute the checksum, but instead allows the NIC hardware to calculate the checksum, and deposit it directly into the checksum field of the packet header before sending the packet to the receiver. During a subsequent reception of an incoming packet, the NIC computes a checksum for the incoming packet, and the computed checksum is communicated to the protocol stack. The protocol stack then compares the value calculated by the NIC with the value found in the packet header, and accepts the packet if the comparison succeeds.

Unfortunately, providing special-purpose hardware in computer systems for computing checksums introduces addition cost. Moreover, some recently developed communication standards, such as the InfiniBand standard, provide reliable link layer communications between computer systems. Hence, additional protocol-level checksums are largely wasted for these reliable network links, which already provide data integrity checks. Unfortunately, checksums in existing protocols, such as TCP/IP, are a requirement, not an option. And this is unlikely to change in the near future.

Hence, what is needed is a method and an apparatus for bypassing use of a protocol checksum during communications across a reliable network link.

SUMMARY

One embodiment of the present invention provides a system for bypassing use of a protocol checksum during communications across a reliable network link. The system operates by configuring a communication system to bypass use of the checksum during communications across the reliable network link. When the system subsequently receives an outbound packet to be transmitted to a destination across the reliable network link, the system sends the outbound packet to the destination without computing the checksum for the outbound packet.

In one embodiment of the present invention, upon receiving an inbound packet from a source across the reliable network link, the system accepts the inbound packet without re-computing the checksum, wherein re-computation of the checksum is required by the communication protocol to verify that the inbound packet was received without errors.

In one embodiment of the present invention, configuring the communication system to bypass the checksum involves informing a protocol stack within the communication system that network interface hardware for the communication system is capable of computing the checksum, so that the protocol stack does not compute the checksum.

In one embodiment of the present invention, the system additionally determines whether the outbound packet is directed to a valid destination that is eligible for checksum bypassing. If not, the system computes the checksum for the outbound packet, and inserts the checksum into the outbound packet.

In one embodiment of the present invention, the checksum is computed by a driver associated with network interface hardware for the communication system.

In one embodiment of the present invention, accepting the inbound packet without re-computing the checksum involves communicating a default checksum value to a protocol stack within the communication system. The default checksum value matches the default checksum value contained within a checksum field of the inbound packet. This causes the protocol stack to subsequently match the default checksum value with the checksum field of the inbound packet and to consequently accept the inbound packet.

In one embodiment of the present invention, accepting the inbound packet without re-computing the checksum additionally involves inserting the default checksum value into the checksum field of the inbound packet.

In one embodiment of the present invention, the communication protocol includes one of: Transmission Protocol (TCP), Internet Protocol (IP), and User Datagram Protocol (UDP).

In one embodiment of the present invention, the reliable network link adheres to the InifiBand standard.

In one embodiment of the present invention, the checksum is a TCP checksum, and the protocol stack is an IP stack.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Sender and Receiver

Figure 1:
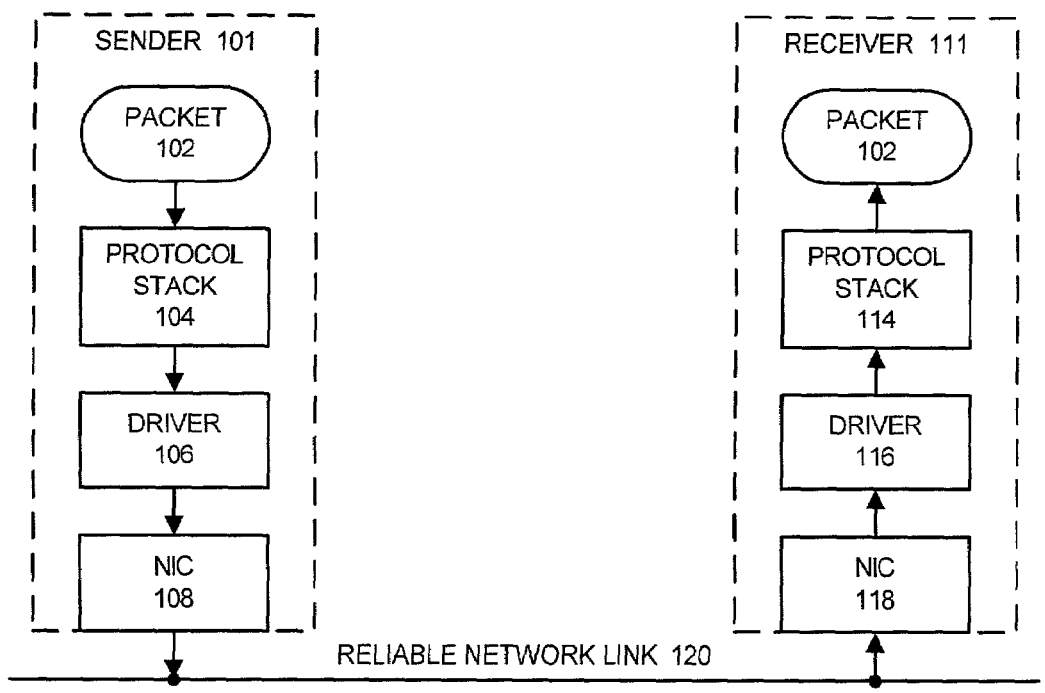
FIG. 1 illustrates a sender and a receiver that communicate across a reliable network link in accordance with an embodiment of the present invention.

FIG. 1 illustrates a sender 101 and a receiver 111 that communicate across a reliable network link 120 in accordance with an embodiment of the present invention. Sender 101 and receiver 111 can generally include any type of computing device, including, but not limited to, a computing device based on a microprocessor, a mainframe computer, a digital signal processor, a portable computing device, a personal organizer, a device controller, and a computational engine within an appliance.

Reliable network link 120 can generally include any type of wire or wireless communication channel capable of coupling together computing nodes through a reliable transport mechanism. This includes, but is not limited to a linkage within, a local area network, a wide area network, or a combination of networks. Note that reliable network link 120 can generally include any type of communication link that can assure data integrity so that additional protocol checksums are not necessary. In one embodiment of the present invention, reliable network link 120 adheres to the InfiniBand standard.

During operation, sender 101 starts with a packet 102 to be sent to receiver 111. Within sender 101, packet 102 passes through protocol stack 104 and driver 106 before being received at NIC 108. NIC 108 includes hardware that transmits packet 102 across reliable network link 120 to receiver 111. Note that protocol stack 104 can generally include any type of protocol stack for processing packets for a specific communication protocol. For example, protocol stack 104 can include an Internet Protocol (IP) stack. Also note that driver 106 can generally include any type of software driver for NIC 108.

For systems without a reliable communication mechanism, during the packet sending process, checksums can be computed by software that is part of protocol stack 104, or alternatively by special-purpose hardware within NIC 108.

Upon reaching receiver 111, packet 102 passes through NIC 118 and driver 116 before being passed to protocol stack 118. Protocol stack 114 then process packet 102 before forwarding it to an application within receiver 111.

Note that for systems without a reliable communication mechanism, during the packet receiving process, checksums can be computed by software that is part of protocol stack 114, or alternatively by special-purpose hardware within NIC 118.

Packet Structure

Figure 2:
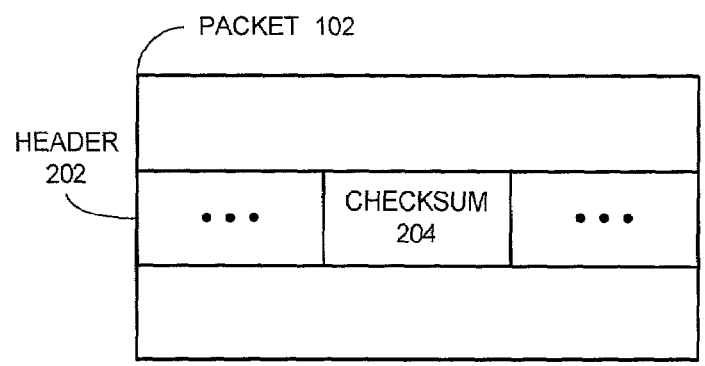
FIG. 2 illustrates the structure of a packet in accordance with an embodiment of the present invention.

FIG. 2 illustrates the structure of a packet 102 in accordance with an embodiment of the present invention. Packet 102 can include a packet for a number of different communication protocols, including: Transmission Protocol (TCP), Internet Protocol (IP), and User Datagram Protocol (UDP). Packet 102 includes a header 202, which contains a checksum 204. Checksum 204 can include any type of checksum, message digest or cyclic redundancy check (CRC) that can be used to verify integrity of data within packet 102 as long as the sender and the receiver agree a priori to use the same function. Checksum 204 is generally calculated by applying a function to data within packet 102.

Process of Sending an Outbound Packet

Figure 3:
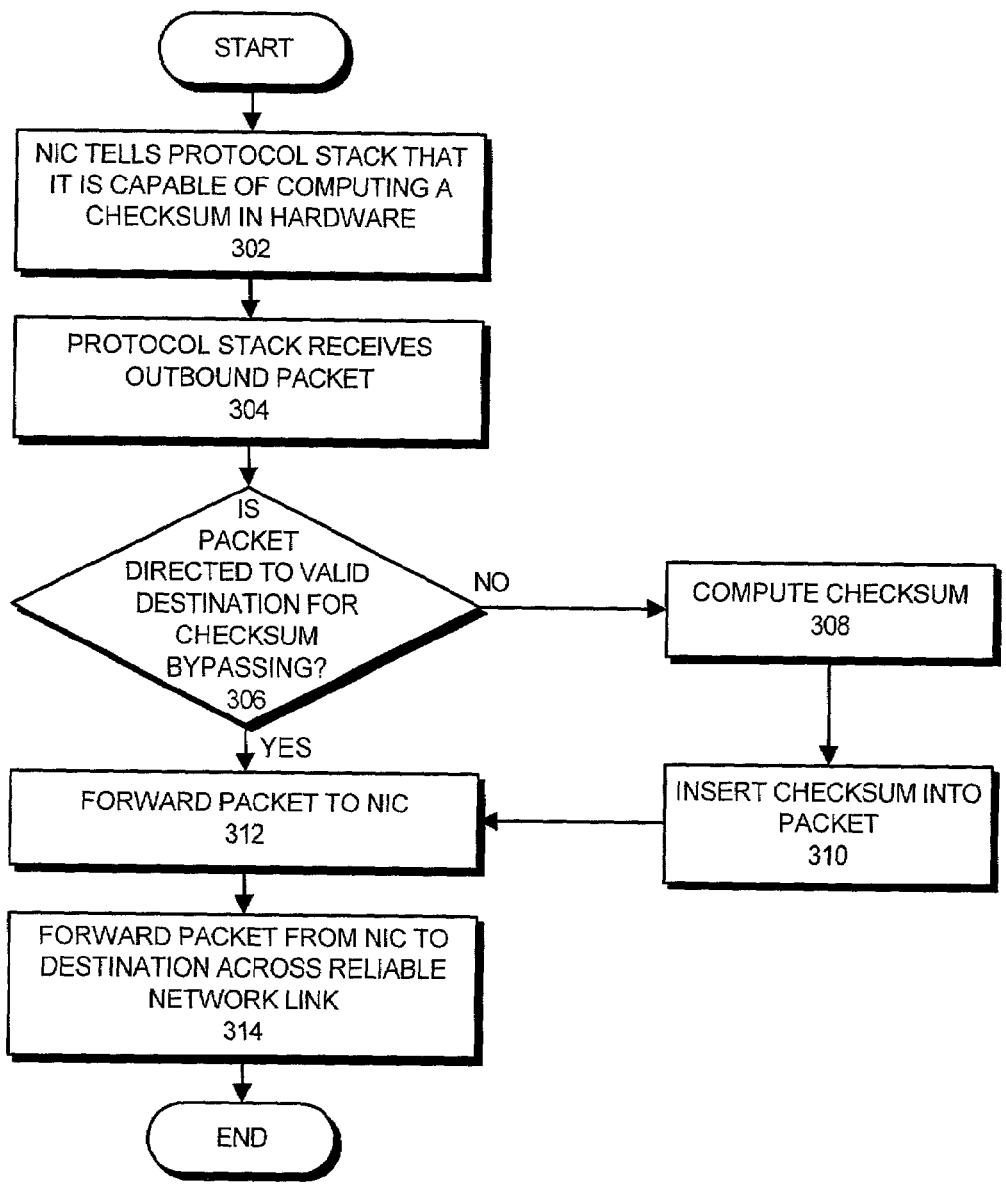
FIG. 3 is a flow chart illustrating the process of sending an outbound packet in accordance with an embodiment of the present invention.

FIG. 3 is a flow chart illustrating the process of sending an outbound packet 102 from sender 101 in accordance with an embodiment of the present invention. At any time during or after system initialization, driver 106 informs protocol stack 104 that NIC 108 is capable of computing a checksum with special-purpose hardware (step 302). This causes protocol stack 104 to be reconfigured so that it does not compute a checksum. Next, protocol stack 104 receives outbound packet 102 to be transmitted to receiver 111 (step 304). Protocol stack 104 then processes packet 102 without computing the checksum.

The system next determines whether packet 102 is directed to a valid destination for checksum bypassing (step 306). A valid destination typically resides at the other end of a reliable communication link, such as reliable network link 120. If not, the system computes the checksum (step 308), and inserts the checksum into packet 102 (step 310). In one embodiment of the present invention, this checksum is computed by driver 106. Note that for systems that only communicate across reliable communication links, steps 306, 308 and 310 are not necessary.

Next, if packet 102 is directed to a valid destination, or if a checksum has been computed, the system forwards packet 102 to NIC 108. NIC 108 then forwards packet 102 to destination 111 through reliable network link 120 (step 314).

Process of Receiving an Inbound Packet

Figure 4:
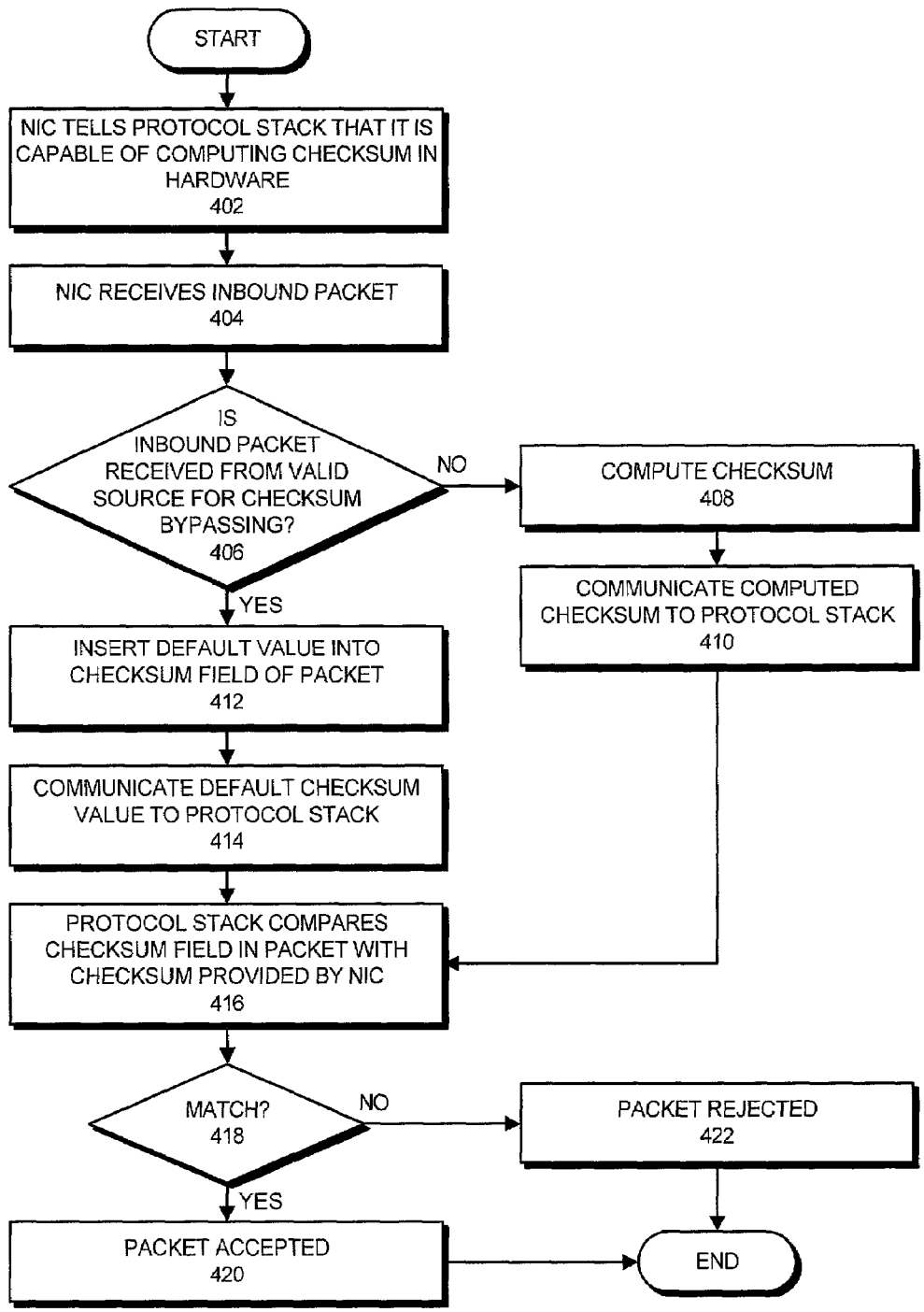
FIG. 4 is a flow chart illustrating the process of receiving an inbound packet in accordance with an embodiment of the present invention.

FIG. 4 is a flow chart illustrating the process of receiving an inbound packet 102 at receiver 111 in accordance with an embodiment of the present invention. At any time during or after system initialization, driver 116 informs protocol stack 114 that NIC 118 is capable of computing a checksum using special-purpose hardware (step 402). This causes protocol stack to be reconfigured so that it does not compute the checksum.

Next, NIC 118 receives inbound packet 102 from sender 101 (step 404). The system then determines whether inbound packet 102 is received from a valid source for checksum bypassing (step 406). A valid source typically resides at the other end of a reliable communication link, such as reliable network link 120. One embodiment of the present invention performs a lookup based on the source address of the packet into a table of valid source addresses to determine if the packet is directed to a valid source. If not, the system computes the checksum (step 408), and communicates the computed checksum to protocol stack 114 (step 410). In one embodiment of the present invention, this checksum computation is performed by driver 116. Note that for systems that only communicate across reliable communication links, steps 406, 408 and 410 are not necessary.

If packet 102 is received from a valid source, the system inserts a default value into the checksum field of the packet (step 412). The system also communicates the same default value to protocol stack 114 (step 414).

Next, when either the default value or the computed checksum has been communicated to protocol stack 114, and after protocol stack 114 receives packet 102, protocol stack 114 compares the checksum field within packet 102 with the checksum value provided by NIC 108 (step 416). If these values do not match, the packet is rejected (step 418). Otherwise, if these values match, the system accepts the packet (step 420).

Note that by inserting a default value into the packet and by communicating the same default value to the protocol stack, the protocol stack can be tricked into accepting the packet even though a checksum value has not actually been computed by NIC 118. This allows the system to defer to reliable network link 120 to ensure data integrity while still maintaining compatibility with existing protocols that expect a checksum to be computed at the protocol level.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for bypassing use of a protocol checksum during communications across a reliable network link, comprising:
   configuring a communication system to bypass use of the checksum during communications across the reliable network link;
   receiving an outbound packet at a source to be transmitted to a destination across the reliable network link;
   determining whether the outbound packet is directed to a valid destination that is eligible for checksum bypassing; and
   if so, sending the outbound packet to the destination across the reliable network link without computing the checksum for the outbound packet;
   wherein neither the source nor the destination computes the checksum for the outbound packet.

2. The method of claim 1, wherein configuring the communication system to bypass the checksum involves informing a protocol stack within the communication system that network interface hardware for the communication system is capable of computing the checksum, so that the protocol stack does not compute the checksum.

3. The method of claim 2,
   wherein the checksum is a TCP checksum; and
   wherein the protocol stack is an IP stack.

4. The method of claim 1, further comprising:
   if the outbound packet is not directed to a valid destination,
   computing the checksum for the outbound packet, and
   inserting the checksum into the outbound packet.

5. The method of claim 4, wherein the checksum is computed by a driver associated with network interface hardware for the communication system.

6. The method of claim 1, further comprising:
   receiving an inbound packet from a source across the reliable network link; and
   accepting the inbound packet without re-computing the checksum;
   wherein re-computation of the checksum is required by the communication protocol to verify that the inbound packet was received without errors.

7. The method of claim 6, wherein accepting the inbound packet without re-computing the checksum involves:
   communicating a default checksum value to a protocol stack within the communication system;
   wherein the default checksum value matches the default checksum value contained within a checksum field of the inbound packet;
   whereby the protocol stack will match the default checksum value with the checksum field of the inbound packet and will consequently accept the inbound packet.

8. The method of claim 7, wherein accepting the inbound packet without re-computing the checksum additionally involves inserting the default checksum value into the checksum field of the inbound packet.

9. The method of claim 1, wherein the communication protocol includes one of:
   Transmission Protocol (TCP);
   Internet Protocol (IP); and
   User Datagram Protocol (UDP).

10. The method of claim 1, wherein the reliable network link adheres to the Infiniband™ standard.

11. A computer-readable storage medium storing instructions that when executed by a computer cause the computer to perform a method for bypassing use of a protocol checksum during communications across a reliable network link, the method comprising:
    configuring a communication system to bypass use of the checksum during communications across the reliable network link;
    receiving an outbound packet at a source to be transmitted to a destination across the reliable network link;
    determining whether the outbound packet is directed to a valid destination that is eligible for checksum bypassing; and
    if so, sending the outbound packet to the destination across the reliable network link without computing the checksum for the outbound packet;
    wherein neither the source nor the destination computes the checksum for the outbound packet.

12. The computer-readable storage medium of claim 11, wherein configuring the communication system to bypass the checksum involves informing a protocol stack within the communication system that network interface hardware for the communication system is capable of computing the checksum, so that the protocol stack does not compute the checksum.

13. The computer-readable storage medium of claim 12,
wherein the checksum is a TCP checksum; and
wherein the protocol stack is an IP stack.

14. The computer-readable storage medium of claim 11, wherein the method further comprises:
if the outbound packet is not directed to a valid destination,
computing the checksum for the outbound packet, and
inserting the checksum into the outbound packet.

15. The computer-readable storage medium of claim 14, wherein the checksum is computed by a driver associated with network interface hardware for the communication system.

16. The computer-readable storage medium of claim 11, wherein the method further comprises:
receiving an inbound packet from a source across the reliable network link; and
accepting the inbound packet without re-computing the checksum;
wherein re-computation of the checksum is required by the communication protocol to verify that the inbound packet was received without errors.

17. The computer-readable storage medium of claim 16, wherein accepting the inbound packet without re-computing the checksum involves:
communicating a default checksum value to a protocol stack within the communication system;
wherein the default checksum value matches the default checksum value contained within a checksum field of the inbound packet;
whereby the protocol stack will match the default checksum value with the checksum field of the inbound packet and will consequently accept the inbound packet.

18. The computer-readable storage medium of claim 17, wherein accepting the inbound packet without re-computing the checksum additionally involves inserting the default checksum value into the checksum field of the inbound packet.

19. The computer-readable storage medium of claim 11, wherein the communication protocol includes one of:
Transmission Protocol (TCP);
Internet Protocol (IP); and
User Datagram Protocol (UDP).

20. The computer-readable storage medium of claim 11, wherein the reliable network link adheres to the Infiniband™ standard.

21. An apparatus that bypasses use of a protocol checksum during communications across a reliable network link, comprising:
a configuration mechanism that selectively configures a communication system to bypass use of the checksum during communications across the reliable network link, wherein the configuration mechanism is configured to determine whether the outbound packet is directed to a valid destination that is eligible for checksum bypassing;
a receiving mechanism at a source that is configured to receive an outbound packet to be transmitted to a destination across the reliable network link; and
a sending mechanism that is configured to send the outbound packet to the destination across the reliable network link without computing the checksum for the outbound packet;
wherein neither the source nor the destination computes the checksum for the outbound packet.

22. The apparatus of claim 21, wherein the configuration mechanism informs a protocol stack within the communication system that network interface hardware for the communication system is capable of computing the checksum, so that the protocol stack does not compute the checksum.

23. The apparatus of claim 22,
wherein the checksum is a TCP checksum; and
wherein the protocol stack is an IP stack.

24. The apparatus of claim 21,
wherein if the outbound packet is not directed to a valid destination, the configuration mechanism is configured to,
compute the checksum for the outbound packet, and to
insert the checksum into the outbound packet.

25. The apparatus of claim 24, wherein the checksum is computed by a driver associated with network interface hardware for the communication system.

26. The apparatus of claim 21, wherein the receiving mechanism is configured to:
receive an inbound packet from a source across the reliable network link; and to
accept the inbound packet without re-computing the checksum;
wherein re-computation of the checksum is required by the communication protocol to verify that the inbound packet was received without errors.

27. The apparatus of claim 26,
wherein the receiving mechanism is configured to communicate a default checksum value to a protocol stack within the communication system; and
wherein the default checksum value matches the default checksum value contained within a checksum field of the inbound packet;
whereby the protocol stack will match the default checksum value with the checksum field of the inbound packet and will consequently accept the inbound packet.

28. The apparatus of claim 27, wherein the receiving mechanism is additionally configured to insert the default checksum value into the checksum field of the inbound packet.

29. The apparatus of claim 21, wherein the communication
protocol includes one of:
Transmission Protocol (TCP);
Internet Protocol (IP); and
User Datagram Protocol (UDP).

30. The apparatus of claim 21, wherein the reliable network link adheres to the Infiniband™ standard.

* * * * *